United States Patent
Kita et al.

(10) Patent No.: US 6,743,374 B2
(45) Date of Patent: Jun. 1, 2004

(54) SELF-EMULSIFIABLE POLYISOCYANATE WITH HIGH FUNCTIONALITY AND PROCESS FOR PRODUCING THE SAME

(75) Inventors: Motomu Kita, Yokohama (JP); Mitsushige Ikemoto, Yokohama (JP); Toshiaki Sasahara, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 10/208,034

(22) Filed: Jul. 31, 2002

(65) Prior Publication Data
US 2003/0105267 A1 Jun. 5, 2003

(30) Foreign Application Priority Data
Nov. 26, 2001 (JP) ..................... P2001-359358

(51) Int. Cl.$^7$ .............................. C08G 18/22
(52) U.S. Cl. .................. 252/182.2; 528/49; 528/56; 560/25; 560/26; 560/115; 560/158; 560/166; 560/330; 560/336; 560/355; 524/591; 524/839; 524/840

(58) Field of Search ............... 252/182.2; 528/49, 528/56; 560/25, 26, 115, 158, 166, 330, 336, 355; 524/591, 839, 840

(56) References Cited
FOREIGN PATENT DOCUMENTS

| JP | 11-100426 A | 4/1999 |
|---|---|---|
| JP | 11-349805 A | 12/1999 |
| JP | 2000-34439 A | 2/2000 |

*Primary Examiner*—Rachel Gorr
(74) *Attorney, Agent, or Firm*—Sughrue Mion, PLLC

(57) ABSTRACT

A self-emulsifiable polyisocyanate with high functionality, having the average number of functional groups in 4.3 or more and a viscosity of 8,000 mPa·s (at 25° C.) or less, which is obtained by subjecting a modified polyisocyanate containing allophanate bonds and a poly(oxyalkylene)glycol monoalkyl ether (e) having oxyethylene bonds in a total amount of 30 mole % or more in its molecule to a urethanization reaction, said modified polyisocyanate being obtained by reacting a polyol (a) having the average number of functional groups in an amount of 2 or more with an organic polyisocyanate (b) in the presence of an allophanate-forming catalyst (c) comprising a zirconium carboxylate; and a process for producing the same.

8 Claims, 2 Drawing Sheets

SELF-EMULSIFIABLE POLYISOCYANATE WITH HIGH FUNCTIONALITY AND PROCESS FOR PRODUCING THE SAME

BACKGROUND OF THE INVENTION (1) Field of the Invention

The present invention relates to a self-emulsifiable polyisocyanate with high functionality, and to a process for producing the same.

(2) Related Prior Art

Various processes for producing a self-emulsifiable polyisocyanate having allophanate bonds have been conventionally known as disclosed in, for example, JP-A-2000-34439, JP-A-11-349805, JP-A-11-100426 and the like.

Most of processes for producing a modified polyisocyanate containing allophanate bonds as disclosed in the above publications aims to produce allophanate bonds. However, these processes have the problem that a self-addition reaction of isocyanate groups and/or a self-polymerization reaction thereof are progressed as a side reaction, whereby a by-product is produced, which gives rise to a final product with a change in color and with turbidity. As the by-product, for example, a dimer with uretdione groups which is thermally unstable, or a trimer with isocyanurate groups which remarkably increases the viscosity of a final product while decreases solubility to a nonpolar solvent and compatibility to a resin such as a high molecular polyester is enumerated. Furthermore, when it is an object of the above processes to produce a polyisocyanate with high functionality, the system of reaction may be probably gelled.

OBJECTS AND SUMMARY OF THE INVENTION

The present invention has been carried out in order to solve the above-mentioned problems. Thus it is an object of the invention to provide a self-emulsifiable polyisocyanate with high functionality and low viscosity which substantially does not contain a dimers or a trimer, and to provide a method of producing the same.

The present inventors have eagerly studied to find the fact that a specific metallic salt can be used as an allophanate-forming catalyst to solve the above problems, whereby the present invention has been accomplished.

That is, the present invention is what is described in the following (1) to (8):

(1) A self-emulsifiable polyisocyanate with high functionality, having the average number of functional groups in 4.3 or more and a viscosity of 8,000 mPa·s (at 25° C.) or less, which is obtained by subjecting a modified polyisocyanate containing allophanate bonds and a poly(oxyalkylene)glycol monoalkyl ether (e) having oxyethylene bonds in a total amount of 30 mole % or more in its molecule to a urethanization reaction, said modified polyisocyanate being obtained by reacting a polyol (a) having the average number of functional groups in an amount of 2 or more with an organic polyisocyanate (b) in the presence of an allophanate-forming catalyst (c) comprising a zirconium carboxylate;

(2) A self-emulsifiable polyisocyanate with high functionality according to the above item (1), wherein said polyol (a) having the average number of functional groups in an amount of 2 or more is a polyol including side chain alkyl groups having the average number of functional groups in an amount of 2 or more;

(3) A self-emulsifiable polyisocyanate with high functionality according to the above item (1), wherein said organic polyisocyanate (b) is hexamethylene diisocyanate;

(4) A self-emulsifiable polyisocyanate with high functionality according to the above item (1), wherein the content of said poly(oxyalkylene)glycol monoalkyl ether (e) having oxyethylene bonds in a total amount of 30 mole % or more in its molecule to be used is in the range of 1 to 30% by weight of the resultant self-emulsifiable polyisocyanate with high functionality;

(5) A process for producing a self-emulsifiable polyisocyanate with high functionality according to the above item (1), wherein said process comprises the following first to fourth steps:

the first step: of reacting a polyol (a) having the average number of functional groups in an amount of 2 or more with an organic polyisocyanate (b) under an allophanate-forming catalyst (c) comprising a zirconium carboxylate;

the second step: of terminating the allophanate-forming reaction by adding a catalytic poison (d) thereto;

the third step: of removing a free organic polyisocyanate (b); and the fourth step: of subjecting a modified polyisocyanate containing allophanate bonds as provided in the third step and a poly(oxyalkylene)glycol monoalkyl ether (e) having oxyethylene bonds in a total amount of 30 mole % or more in its molecule to a urethanization reaction;

(6) A process for producing a self-emulsifiable polyisocyanate with high functionality according to the above item (5), wherein said polyol (a) having the average number of functional groups in an amount of 2 or more is a polyol including side chain alkyl groups having the average number of functional groups in an amount of 2 or more;

(7) A process for producing a self-emulsifiable polyisocyanate with high functionality according to the above item (5), wherein said organic polyisocyanate (b) is hexamethylene diisocyanate; and (8) A process for producing a self-emulsifiable polyisocyanate with high functionality according to the above item (5), wherein the amount of said poly(oxyalkylene)glycol monoalkyl ether (e) having oxyethylene bonds in a total amount of 30 mole % or more in its molecule to be used is 1 to 30% by weight of the resultant self-emulsifiable polyisocyanate with high functionality.

DETAILED DESCRIPTION OF THE INVENTION

First of all, materials used in the present invention will be explained.

As the polyol (a) having the average number of functional groups in an amount of 2 or more as used in the present invention, a low molecular weight polyol such as ethylene glycol, 1,2-propanediol, 1,3-propanediol, 1,2-buthanediol, 1,3-buthanediol, 1,4-buthanediol, 1,5-pentanediol, 1,6-hexanediol, 2-methyl-1,5-pentanediol, 3-methyl-1,5-pentanediol, neopentyl glycol, 1,8-octanediol, 1,9-nonanediol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecane-1,2-ethylene glycol, 2-n-eicosane-1,2-ethylene glycol, 2-n-octacosane-1,2-ethylene glycol, diethylene glycol, dipropylene glycol, triethylene glycol, cyclohexane-1,4-diol, cyclohexane-1,4-dimethanol, hydrogenated bisphenol A, bis (β-hydroxyethyl)benzene, an addition product of bisphenol A to ethylene oxide or propylene oxide, trimethylolpropane, glycerin or pentaerythriol; or a polyether polyol as obtained by adding a low molecular weight cyclic ether such as ethylene oxide or propylene oxide to an initiator selected from the group consisting of the above-mentioned low molecular weight polyol, the after-mentioned low molecular weight polyamine, and a low molecular weight amino alcohol; or a polyester polyol which is obtained by adding a low molecular weight cyclic ester such as ε-caprolactone or γ-valerolactone to an initiator selected from the group consisting of the above-mentioned low molecular weight polyol, the low molecular weight polyamine, and the low molecular weight amino alcohol; or a polyester polyol as obtained by the condensation polymerization of the above low molecular weight polyol and a polycarboxylic acid such as succinic acid, adipic acid or phthalic acid can be enumerated.

These polyols may be individually used, or two or more thereof may be mixed with each other for use.

Incidentally, as the low molecular weight polyamine, ethylenediamine, isophoronediamine, diethylenetriamine, and the like can be enumerated. As the low molecular weight amino alcohol, monoethanolamine, dimonoethanolamine, and the like can be enumerated.

In the present invention, when a polyol with side chain alkyl groups is used as a polyol (a), the resultant self-emulsifiable polyisocyanate is decreased in viscosity, and thus it is preferred. As the polyol (a), a polyether polyol or an aliphatic polyol with side chain alkyl groups having a carbon atom number of 10 or less is more preferred, and 1,2-propanediol, 1,3-butanediol, 2-methyl-1,5-penthanediol, 3-methyl-1,5-penthanediol, neopentyl glycol, 2,2-diethyl-1,3-propanediol, 2-n-butyl-2-ethyl-1,3-propanediol, or poly(oxypropylene)polyol is specifically preferred.

The average number of functional groups in the polyol (a) is 2 or more, preferably 2 to 3. When the average number of functional groups is less than the lower limit, the average number of functional groups in the resultant modified polyisocyanate is decreased, and thus crosslinking effect is decreased, and the strength of coating tends to become unsatisfactory.

As the organic polyisocyanate (b) as used in the present invention, anaromatic diisocyanate (for example, 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,5-diisocyanate, or 3,3'-dimethoxydiphenyl-4,4'-diisocyanate), or an aliphatic diisocyanate (for example, hexamethylene diisocyanate, tetramethylene diisocyanate, 2-methylpentane-1,5-diisocyanate, 3-methylpentane-1,5-diisocyanate, lysine diisocyanate, or trioxyethylene diisocyanate), or an aromatic aliphatic diisocyanate (for example, xylylene-1,4-diisocyanate, xylylene-1,3-diisocyanate, or tetramethylxylylene diisocyanate), or an alicyclic diisocyanate (for example, isophorone diisocyanate, hydrogenated tolylene diisocyanate, hydrogenated xylene diisocyanate, hydrogenated diphenylmethane diisocyanate, or hydrogenated tetramethylxylene diisocyanate), or the like can be enumerated.

These organic polyisocyanates may be individually used, or two or more thereof may be mixed with each other for use.

In the present invention, in the light of the weather resistance of a self-emulsifiable polyisocyanate with high functionality, an aliphatic diisocyanate and/or an alicyclic diisocyanate are preferred, and specifically hexamethylene diisocyanate is most suitable therefor.

The allophanate-forming catalyst (c) as used in the present invention includes a zirconium carboxylate. When the zirconium carboxylate is used, a modified polyisocyanate containing allophanate bonds, which is substantially colorless, and is low in viscosity, can be relatively easily provided without using any co-catalyst.

As a carboxylic acid corresponding to the above carboxylate, a monocarboxylic acid such as a saturated aliphatic carboxylic acid (for example, acetic acid, propionic acid, butyric acid, caproic acid, octylic acid, lauric acid, myristic acid, palmitic acid, stearic acid, or 2-ethylhexanoic acid), a saturated monocyclic carboxylic acid (for example, cyclohexane carboxylate, or cyclopentane carboxylate), a saturated polycyclic carboxylic acid (for example, bicyclo [4.4.0]decane-2-carboxylic acid), a mixture of the above carboxylic acids (for example, naphthenic acid), an unsaturated aliphatic acid (for example, oleic acid, linoleic acid, linolenic acid, soybean oil fatty acid, or tall oil fatty acid), an aromatic aliphatic carboxylic acid (for example, diphenylacetic acid), or an aromatic carboxylic acid (for example, benzoic acid, or toluic acid); or a polycarboxylic acid such as phthalic acid, isophthalic acid, terephthalic acid, naphthalenedicarboxylic acid, succinic acid, tartaric acid, oxalic acid, malonic acid, glutaric acid, adipic acid, pimelic acid, suberic acid, glutaconic acid, azelaic acid, sebacic acid, 1,4-cyclohexyldicarboxylic acid, α-hydromuconic acid, β-hydromuconic acid, α-butyl- α-ethylglutaric acid, α, β-diethylsuccinic acid, maleic acid, fumaric acid, trimellitic acid, or pyromellitic acid can be enumerated.

Zirconium carboxylates from these carboxylic acids may be individually used, or two or more thereof may be mixed with each other for use.

A preferred allophanate-forming catalyst (c) in the present invention is a zirconium monocarboxylate having a carbon atom number of 10 or less.

As the catalytic poison (d) as used in the present invention, an inorganic acid (for example, phosphoric acid, or hydrochloric acid); an organic acid containing sulfonate groups, sulfamate groups, or the like; or an ester therefrom; or an acyl halide; or the like can be enumerated.

A poly(oxyalkylene)glycol monoalkyl ether (e) as used in the present invention includes oxyethylene bonds in a total amount of 30 mole % or more in the molecule.

As an initiator for producing the poly(oxyalkylene)glycol monoalkyl ether (e), methanol, ethanol, n-propanol, isopropanol, n-butanol, isobutanol, tert-butanol, cyclohexanol, phenol, or the like can be enumerated. Among others, a low molecular weight and monofunctional alcohol having a carbon atom number of 5 or less and a molecular weight of 32 to 200, such as methanol or ethanol, is preferred, because a self-emulsifiable polyisocyanate with high functionality is improved in water-dispersibility.

If necessary, a poly (oxyalkylene) glycol monoalkyl ether (e) may be used together with a hydrophobic and monofunctional alcohol except the same.

As this hydrophobic and monofunctional alcohol, a higher monoalcohol having a carbon atom number of 6 or more, a hydroxymonocarboxylate, a poly(oxyalkylene)monool except the poly(oxyalkylene)glycol monoalkyl ether (e), a low molecular weight and monofunctional alcohol as the initiator for producing the above poly(oxyalkylene)glycol monoalkyl ether (e), or the like can be enumerated. Further specifically, methanol, ethanol, octanol, stearyl alcohol, alkylricinoleate, or the like can be enumerated therefor.

Next, a specific procedure for producing a self-emulsifiable polyisocyanate with high functionality of the present invention will be explained.

A process for producing a self-emulsifiable polyisocyanate with high functionality of the present invention comprises the following first to fourth steps:

the first step: of reacting a polyol (a) having the average number of functional groups in an amount of 2 or more with an organic polyisocyanate (b) under an allophanate-forming catalyst (c) comprising a zirconium carboxylate;

the second step: of terminating the allophanate-forming reaction by adding a catalytic poison (d) thereto;

the third step: of removing a free organic polyisocyanate (b); and the fourth step: of subjecting a modified polyisocyanate containing allophanate bonds as provided in the third step and a poly(oxyalkylene)glycol monoalkyl ether (e) having oxyethylene bonds in a total amount of 30 mole % or more in its molecule to a urethanization reaction.

The first step comprises a urethanization reaction and an allophanate-forming reaction, which specifically comprises the procedures of: charging a polyol (a) and an organic polyisocyanate (b), provided that the amount of isocyanate groups exceed that of hydroxyl groups; and subjecting them to the urethanization reaction; and thereafter subjecting the same to the allophanate-forming reaction under an allophanate-forming catalyst (c) until urethane groups are substantially lost.

Here, the expression "the amount of isocyanate groups exceed that of hydroxyl groups" means that when raw materials are charged, the amount of isocyanate groups are made to exceed that of hydroxyl groups. The molar ratio of isocyanate groups to hydroxyl groups is preferably 8 or more, and specifically preferably in the range of 10 to 50.

A temperature for the urethanization reaction is in the range of 20° C. to 120° C., and preferably in the range of 50° C. to 100° C.

For the urethanization reaction, a publicly known urethanization catalyst may be used. As such a urethanization catalyst, specifically, an organometallic compound such as dibutyltin dilaurate or dioctyltin dilaurate; an organic amine such as triethylenediamine or triethylamine; a salt thereof; or the like can be enumerated.

Although the time for the urethanization reaction varies according to the existence of a urethanization catalyst, the type thereof, and the reaction temperature, it is generally ten hours or less, and preferably in the range of 1 to 5 hours.

The allophanate-forming reaction is carried out using an allophanate-forming catalyst (c) at a reaction temperature in the range of 70° C. to 150° C., more preferably 90° C. to 130° C. When the reaction temperature is too low, allophanate bonds are not formed in a large amount, whereby the average number of functional groups in the resultant modified polyisocyanate containing allophanate bonds is decreased. When a self-emulsifiable polyisocyanate with high functionality as produced by using such a modified isocyanate is employed as a paint curing agent, the resultant coating film tends to become insufficient in physical properties. When the reaction temperature is too high, the resultant modified polyisocyanate containing allophanate bonds causes unnecessary heating, whereby it may be tinted. Incidentally, the expression "the average number of functional groups in a modified polyisocyanate containing allophanate bonds" means the average number of isocyanate groups in one molecule of the modified polyisocyanate.

Additionally, in the present invention, a urethanization reaction and an allophanate-forming reaction may be carried out at the same time. In this case, a polyol (a) and an organic polyisocyanate (b) are charged, provided that the amount of polyisocyanate groups exceeds that of hydroxyl groups, and then the urethanization reaction and the allophanate-forming reaction are simultaneously carried out in the presence of an allophanate-forming catalyst (c) at a temperature range of, for example, 70° C. to 150° C., for a period of ten hours or less.

The amount of allophanate-forming catalyst (c) to be used, which varies according to the sort thereof, is in the range of 0.0005 to 1% by weight of the sum of a polyol (a) and an organic polyisocyanate (b), and preferably 0.001 to 0.1% by weight thereof. When the amount of the catalyst (c) to be used is lower than 0.0005% by weight, the allophanate-forming reaction is retarded, and takes a long period of time, whereby the resultant product may be tinted through heat history. On the other hand, when the amount of the catalyst to be used is larger than 1% by weight, it is difficult to control the allophanate-forming reaction, whereby a dimerization reaction (or a uretdione-forming reaction) and/or a trimerization reaction (or an isocyanurate-forming reaction) may be caused, and furthermore, when the resultant self-emulsifiable polyisocyanate with high functionality is employed as a curing agent for a two-pack coating, the problem with the coating of being shortened in pot life (or storage stability) and the like may occur.

In addition, in this case, if necessary, an organic solvent may be used. As this organic solvent, an aliphatic hydrocarbon solvent such as n-hexane or octane; an alicyclic hydrocarbon solvent such as cyclohexane or methylcyclohexane; a ketone solvent such as acetone, methyl ethyl ketone, methyl isobutyl ketone, or cyclohexanone; an ester solvent such as methyl acetate, ethyl acetate, butyl acetate, or isobutyl acetate; a glycol ether ester solvent such as ethylene glycol ethyl ether acetate, propylene glycol methyl ether acetate, 3-methyl-3-methoxybutyl acetate, ethyl-3-ethoxypropionate; an ether solvent such as diethyl ether, tetrahydrofuran, or dioxane; an aliphatic hydrocarbon halide solvent such as methyl chloride, methylene chloride, chloroform, carbon tetrachloride, methyl bromide, methylene iodide, or dichloroethane; a polar aprotic solvent such as N-methylpyrrolidone, dimethylformamide, dimethylacetamide, dimethyl sulfoxide, hexamethyl phosphonylamide; or the like can be enumerated.

These organic solvents may be individually used, or two or more thereof may be mixed with each other for use.

The second step is what comprises terminating the allophanate-forming reaction by adding a catalytic poison (d) to the system of reaction, after the urethanization reaction and the allophanate-forming reaction have been finished in the first step.

The time for adding the catalytic poison (d) thereto is not limited, as long as the allophanate-forming reaction has been finished. However, when a thin-film distillation is employed as a method of removing a free organic polyisocyanate in the third step, it is preferred to add the catalytic poison (d) thereto after the allophanate-forming reaction have been finished and before the thin-film distillation is carried out so that a side reaction can be prevented, which may be caused by the generation of heat when the thin-film is distilled.

The amount of the catalyticpoison (d) to be added, which varies according to the sort of the catalytic poison (d) and the sort of the allophanate-forming catalyst, is preferably in the range of 0.5 to 2 equivalent weight of the allophanate-forming catalyst (c), and in particular preferably in the range of 0.8 to 1.5 equivalent weight. When the amount of the catalytic poison to be added is too small, the resultant self-emulsifiable polyisocyanate with high functionality tends to be decreased in storage stability. On the other hand, when the amount is too large, the resultant self-emulsifiable polyisocyanate with high functionality may be tinted.

The third step is what comprises removing a free organic polyisocyanate (b).

After the allophanate-forming reaction has been finished, there commonly exists a free organic polyisocyanate in a reaction product. The free organic polyisocyanate gives rise to a cloud deteriorated with age, or an odor. Thus it is preferred to remove an unreacted organic polyisocyanate until the content of the free organic polyisocyanate is decreased to 1% by weight or less.

As the method of removing the free organic polyisocyanate, a publicly known method such as a distillation method, a reprecipitation method, or an extraction method can be enumerated. The distillation method, particularly a thin-film distillation method, has no use for a solvent and the like, and thus it is preferred. The conditions for a preferred thin-film distillation comprise a pressure of 0.1 kPa or less, and a temperature range of 100° C. to 200° C., and in particular preferably a pressure of 0.05 kPa or less, and a temperature range of 120° C. to 180° C.

The fourth step is what comprises subjecting the resultant modified polyisocyanate containing allophanate bonds and a poly(oxyalkylene)glycol monoalkyl ether (e) to a urethanization reaction.

In the light of the water-dispersibility of a self-emulsifiable polyisocyanate with high functionality, the amount of the poly(oxyalkylene)glycol monoalkyl ether (e) to be used is preferably in the range of 1 to 30% by weight, and more preferably in the range of 2 to 20% by weight of the resultant self-emulsifiable polyisocyanate with high functionality. When the amount of the poly(oxyalkylene) glycol monoalkyl ether (e) to be introduced is less than the lower limit, the resultant self-emulsifiable polyisocyanate with high functionality may be not dispersed in water. On the other hand, when the amount is larger than the upper limit, the average number of functional groups in the self-emulsifiable polyisocyanate with high functionality is decreased, whereby the strength of a coating obtained therefrom tends to be insufficient.

The reaction conditions preferably comprise a temperature range of 20° C. to 120° C., more preferably 50° C. to 100° C., and a period of time of ten hours or less, more preferably in the range of 1 to 5 hours.

Incidentally, in the urethanization reaction, a publicly known urethanization catalyst can be employed.

The viscosity of a self-emulsifiable polyisocyanate with high functionality (at 25° C.; in terms of solid content) is 8,000 mPa·s or less, and preferably in the range of 300 to 3,500 mPa·s. The content of isocyanate in terms of solid content is 3 to 20% by weight, and in particular preferably in the range of 5 to 20% by weight. The average number of functional groups is 4.3 or more, and preferably in the range of 4.3 to 10. When the average number of functional groups is smaller than the lower limit, the stain resistance of a coating obtained therefrom may be insufficient. Incidentally, the average number of functional groups is calculated from the content of isocyanate, and the number average molecular weight through a gel permeation chromatography.

If necessary, a self-emulsifiable polyisocyanate with high functionality can be properly blended with an additive agent such as an oxidation inhibitor, an ultraviolet absorber, a pigment, a dye, a solvent, a flame retardant, a hydrolysis inhibitor, a lubricant, a plasticizer, a filler, a storage stabilizer, or the like, for use.

As explained above, as compared with a conventional self-emulsifiable polyisocyanate, a self-emulsifiable polyisocyanate with high functionality of the present invention is equivalent or similar in water-dispersibility, lower in viscosity, more excellent in performance such as stain resistance.

Thus the self-emulsifiable polyisocyanate with high functionality of the present invention is most suitable as a curing agent for a water-base paint. Furthermore, it can be used as a base material for a water-base paint; or as a base material or a curing agent for: an aqueous adhesive, a sealing material, ink, an agent for treating fibers or glass fibers, a sizing agent, a stopping material, a primer, a consolidating agent, an anchor coating agent, various binders, or the like.

DESCRIPTION OF THE PREFERRED EMBODIMENTS

Figure 1:
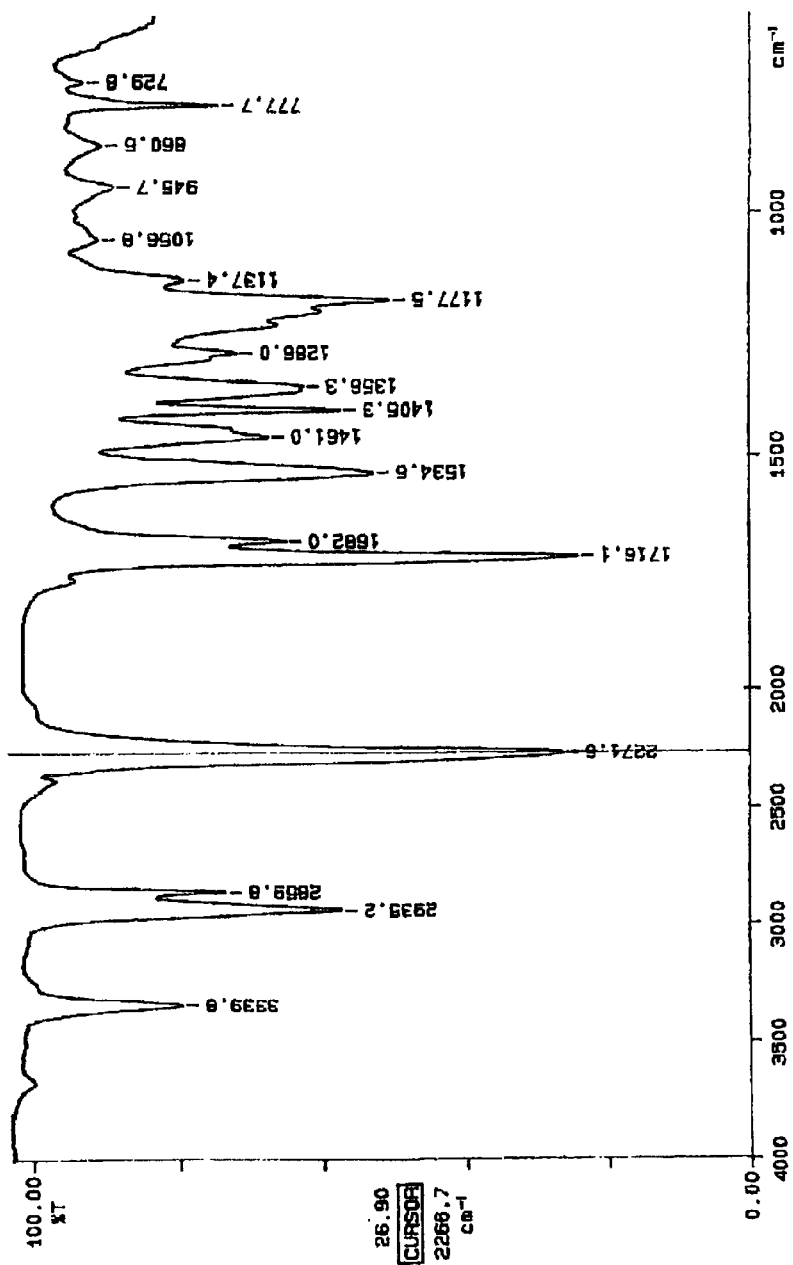
FIG. 1 is an FT-IR chart of NCO-1.

Hereinafter, the present invention will be further in detail explained through Examples and Comparative Examples. However, but the present invention should be understood with no limitation by the same. Incidentally, the expression "%" in Examples and Comparative Examples means "% by weight".

Production of Modified Polyisocyanate Containing Allophanate Bonds:

SYNTHESIS EXAMPLE 1

Into a reactor having a volume of 100 liters which is provided with an agitator, a thermometer, a condenser and a nitrogen-gas introducing tube, 95.0 kg of hexamethylene diiusocyanate and 5.0 kg of 3-methyl-1,5-pentanediol were charged, and subjected to a urethanization reaction at a temperature of 90° C. for a period of two hours. A reaction product was analyzed through an FT-IR, whereby it was found that hydroxyl groups were lost.

Next, 0.02 kg of zirconium 2-ethylhexanoate was charged therein, and reacted at a temperature of 110° C. for a period of four hours. A reaction product was analyzed through an FT-IR and a $^{13}$C-NMR, whereby it was found that urethane groups were lost.

Next, 0.01 kg of phosphoric acid was charged therein, and subjected to a termination reaction for the allophanate-forming reaction. The content of isocyanate in a reaction product after the termination reaction was 40.4%.

This reaction product was subjected to a thin-film distillation at a temperature of 130° C. and a pressure of 0.04 kPa so as to obtain a modified polyisocyanate containing allophanate bonds (NCO-1). The content of isocyanate in NCO-1 was 19.2%; the viscosity thereof was 1,720 mPa·s at a temperature of 25° C.; the average number of functional groups thereof was 4.9; and the content of free hexamethylene diisocyanate therein was 0.1%. Furthermore, NCO-1 was analyzed through an FT-IR and a $^{13}$C-NMR. However, urethane groups were not identified therein, while allophanate bonds were identified therein. Besides, a trace of each of uretdione groups and isocyanurate groups was found.

These results are shown in Table 1.

Besides, an FT-IR chart for NCO-1 is shown in FIG. 1.

SYNTHESIS EXAMPLES 2 to 7, and SYNTHESIS COMPARATIVE EXAMPLE 1

According to a similar manner to Synthesis Example 1, raw materials shown in Table 1 were used, and a modified polyisocyanate containing allophanate bonds was produced.

These results are summarized in Table 1.

Incidentally, NCO-8 (Synthesis Comparative Example 1) was gelled when synthesized.

isocyanate with high functionality containing allophanate bonds was obtained. On the other hand, when a conventional catalyst system (a lead system) in Synthesis Comparative Example 1 was used, no modified polyisocyanate with high functionality containing allophanate bonds was obtained.

PRODUCTION of SELF-EMULSIFIABLE POLYISOCYANATE with HIGH FUNCTIONALITY

SYNTHESIS EXAMPLE 8

Into a reactor having a volume of 1 liter which is provided with a agitator, a thermetor, a condenser and a nitrogen-gas introducing tube, 901 g of the modified polyisocyanate containing allophanate bonds (NCO-1), 100 g of a polyethylene glycol monomethyl ether (OH-1) having a number

TABLE 1

|  | Synthesis Examples | | | | | | | Synthesis Comp. Ex. |
| --- | --- | --- | --- | --- | --- | --- | --- | --- |
|  | 1 | 2 | 3 | 4 | 5 | 6 | 7 | 1 |
| Polyol (kg) MPD | 5.0 |  |  |  |  |  |  | 50.0 |
| 1,3-BD |  | 3.5 |  |  |  |  |  |  |
| 1,4-BD |  |  | 3.5 |  |  |  |  |  |
| NPG |  |  |  | 5.0 |  |  |  |  |
| DMH |  |  |  |  | 6.0 |  |  |  |
| GP-1500 |  |  |  |  |  | 25.0 |  |  |
| GP-400 |  |  |  |  |  |  | 10.0 |  |
| Organic Diisocyanate (kg) HDI | 95.0 | 96.5 | 96.5 | 95.0 | 94.0 | 75.0 | 90.0 | 95.0 |
| Allophanate-Forming Catalyst (kg) |  |  |  |  |  |  |  |  |
| Zr-2EH | 0.02 | 0.02 | 0.02 | 0.02 | 0.02 | 0.02 | 0.02 |  |
| Pb-2EH |  |  |  |  |  |  |  | 0.02 |
| Catalytic Poison (kg) |  |  |  |  |  |  |  |  |
| Phosphoric Acid | 0.01 | 0.01 | 0.01 | 0.01 | 0.01 | 0.01 | 0.01 |  |
| Modified Polyisocyanate |  |  |  |  |  |  |  |  |
| Containing Allophanate Bonds | NCO-1 | NCO-2 | NCO-3 | NCO-4 | NCO-5 | NCO-6 | NCO-7 | NCO-8 |
| Content of Isocyanate (%) | 19.2 | 17.5 | 17.5 | 16.5 | 18.4 | 9.1 | 16.0 |  |
| Viscosity (mPa · s/25° C.) | 1720 | 2460 | 3240 | 1340 | 1250 | 2550 | 6830 | Gelation |
| Av. No. of Functional Groups | 4.9 | 4.7 | 4.7 | 4.6 | 4.7 | 8.0 | 8.8 |  |
| Content of Free HDI (%) | 0.1 | 0.1 | 0.2 | 0.2 | 0.1 | 0.2 | 0.2 |  |
| Analysis |  |  |  |  |  |  |  |  |
| Urethane Groups | no | no | no | no | no | no | no | no |
| Allophanate Bonds | exist | exist | exist | exist | exist | exist | exist | exist |
| Uretdione Groups | trace | trace | trace | trace | trace | trace | trace | exist |
| Isocyanurate Groups | trace | trace | trace | trace | trace | trace | trace | exist |

TABLE 1

| MPD | : 3-methyl-1,5-pentanediol; |
| --- | --- |
| 1,3-BD | : 1,3-butanediol; |
| 1,4-BD | : 1,4-butanediol; |
| NPG | : neopentyl glycol; |
| DMH | : 2-n-butyl-2-ethyl-1,3-propanediol; |
| GP-1500 | : poly(oxypropylene)triol, Number Average Molecular Weight = 1500; |
| GP-400 | : poly(oxypropylene)triol, Number Average Molecular Weight = 400; |
| HDI | : hexamethylene diisocyanate; |
| Zr-2EH | : zirconium 2-ethylhexanoate; and |
| Pb-2EH | : lead 2-ethylhexanoate. |

In each of the Synthesis Examples 1 to 7 in Table 1, a catalyst of a ziroconium caarboxylate was used, a side reaction was substantially controlled, and a modified poly-average molecular weight of 400, and 0.05 g of dioctyltin dilaurate were charged, and were reacted at a temperature of 80° C. for a period of four hours, whereby a self-emulsifiable polyisocyanate with high functionality (P-1) was obtained.

The content of P-1 was 16.4%, the viscosity thereof was 1,980 mPa·s at a temperature of 25° C., and the average number of functional groups thereof was 4.6.

These results are shown in Table 2.

Figure 2:
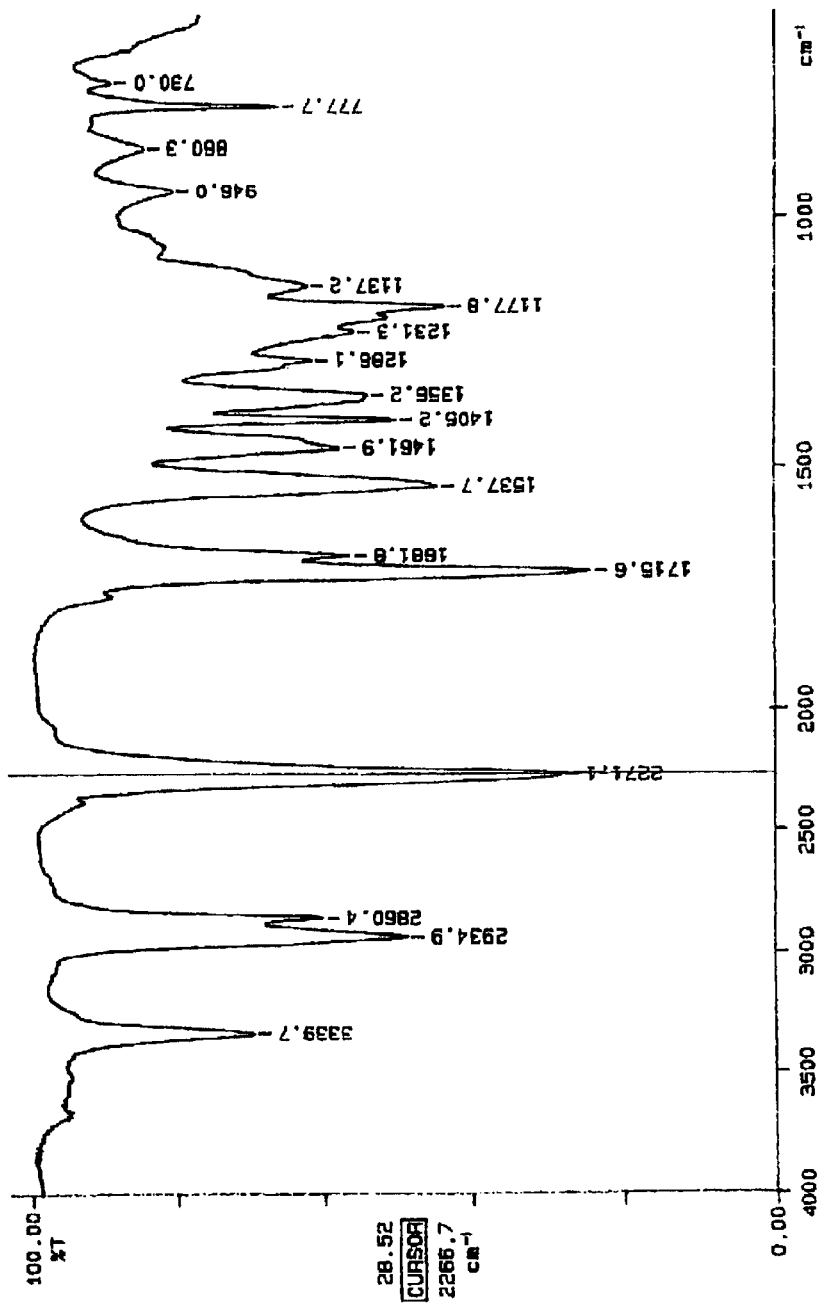
FIG. 2 is an FT-IR chart of P-1.

Besides, an FT-IR chart for P-1 is shown in FIG. 2.

SYNTHESIS EXAMPLES 9 to 17, and SYNTHESIS COMPARATIVE EXAMPLES 2 and 3

According to a similar manner to Synthesis Example 8, raw materials shown in Tables 2 and 3 were used, and self-emulsifiable polyisocyanate with high functionality (P-2 to P-12) were produced.

The results are summarized in Tables 2 and 3.

TABLE 2

|  | Synthesis Examples | | | | | |
| --- | --- | --- | --- | --- | --- | --- |
|  | 8 | 9 | 10 | 11 | 12 | 13 |
| Modified Polyisocyanate Containing Allophanate Bonds (g) | | | | | | |
| NCO-1 | 900 |  |  | 850 |  |  |
| NCO-2 |  | 900 |  |  | 860 |  |
| NCO-3 |  |  | 880 |  |  | 880 |
| Polyethylene Glycol Monomethyl Ether (g) | | | | | | |
| OH-1 | 100 | 100 | 120 | 100 | 100 | 100 |
| Hydrophobic Monofunctional Alcohol (g) | | | | | | |
| OH-2 |  |  |  | 50 | 20 | 20 |
| Urethanization Catalyst (g) | | | | | | |
| DOTDL | 0.05 | 0.05 | 0.05 | 0.05 | 0.05 | 0.05 |
| Self-Emulsifiable Polyisocyanate with High Functionality | P-1 | P-2 | P-3 | P-4 | P-5 | P-6 |
| Content of Isocyanate (%) | 16.4 | 14.7 | 14.1 | 14.5 | 14.1 | 14.1 |
| Viscosity (mpa · s/25° C.) | 1980 | 2630 | 3430 | 2250 | 3000 | 3530 |
| Average Number of Functional Groups | 4.6 | 4.4 | 4.3 | 4.4 | 4.3 | 4.3 |

TABLE 3

|  | Synthesis Examples | | | | Synthesis Comp. Ex. | |
| --- | --- | --- | --- | --- | --- | --- |
|  | 14 | 15 | 16 | 17 | 2 | 3 |
| Modified Polyisocyanate Containing Allophanate Bonds (g) | | | | | | |
| NCO-4 | 900 |  |  |  |  |  |
| NCO-5 |  | 862 |  |  |  |  |
| NCO-6 |  |  | 862 |  |  |  |
| NCO-7 |  |  |  | 862 |  |  |
| COLLONATE HX |  |  |  |  | 862 | 725 |
| Polyethylene Glycol Monomethyl Ether (g) | | | | | | |
| OH-1 | | | | | | |
| Hydrophobic Monofunctional Alcohol (g) | 100 | 138 | 138 | 138 | 138 | 145 |
| OH-2 | | | | | | |
| Urethanization Catalyst (g) |  |  |  |  |  | 130 |
| DOTDL | | | | | | |
| Self-Emulsifiable Polyisocyanate with High | 0.05 | 0.05 | 0.05 | 0.05 | 0.05 | 0.05 |
| Functionality | P-7 | P-8 | P-9 | P-10 | P-11 | P-12 |
| Content of Isocyanate (%) | 12.8 | 14.4 | 6.4 | 12.3 | 16.8 | 12.1 |
| Viscosity (mpa · s/25° C.) | 1550 | 1760 | 2720 | 7320 | 2500 | 3000 |
| Average Number of Functional Groups | 4.3 | 4.3 | 6.5 | 7.9 | 3.41 | 2.91 |

In Tables 2 and 3,
COLLONATE HX:
  Modified polyisocyanate containing isocyanurate bonds manufactured from hexamethylene diisocyanate,
  Produced by NIPPON POLYURETHANE Co., Ltd.,
  Content of isocyanate=21.3%,
  Viscosity=2,400 mPa·s/25° C.;
OH-1:
  Polyethylene glycol monomethyl ether which produced by subjecting ethylene oxide to a ring-opening addition with methanol (as an initiator),
  Number average molecular weight=400;
OH-2:
  Methyl ricinoleate; and DOTDL:
  Dioctyltin Dilaurate.
  There is little difference between FIG. 1 and FIG. 2, except that the right side area of a peak at 1137 cm$^{-1}$ in FIG. 2 is broader than the one corresponding to a peak in FIG. 1. This broad area is the one from absorption by the polyether.

Application Examples 1 to 10, and Application Comparative Examples 1 and 2

The following performance tests were carried out by using the self-emulsifiable polyisocyanate with high functionality (P-1 to P-12).

The results are summarized in Tables 4 and 5.

DETERMINATION of POT LIFE

Into a container having a volume of 300 ml, 20g of a self-emulsifiable polyisocyanate with high functionality, and 180 g of water were charged, and were agitated at 2,000 rpm for a period of 30 seconds by a homomixer for dispersion. Thereafter, the mixture was left at rest at room temperature, the content of isocyanate was determined every one hour. The point of time when the content of isocyanate had decreased to 0% was determined as a pot life time.

RUBBING TEST

Into a container having a volume of 300 ml, 100 g of an aqueous acrylic emulsion as produced according to the following method, and 3 g of a self-emulsifiable polyisocyanate with high functionality were charged, and were agitated at 2,000 rpm for a period of 30 seconds by a homomixer, whereby a clear paint was prepared. This clear paint was applied to an aluminum plate by means of an applicator so that a dry film thickness of 20 μm can be provided, and thereafter it was cured at a temperature of 50° C. for a period of twenty hours so as to obtain coated samples. The coated samples were rubbed with an absorbent cotton which was infiltrated with xylene, and the number of times at which the surface of a coating film was coarsened was determined.

PRODUCTION of AQUEOUS ACRYLIC EMULSION

Into a reactor having a volume of 2 liters as provided with an agitator, a thermometer, a nitrogen seal tube and a condenser, 170 g of ion exchanged water, 4 g of REVENOL WZ (an anionic emulsifying agent; from Kao Corp.), and 1 g of NOIGEN EA-170 (a nonionic emulsifying agent; from Dai-ichi Kogyo Seiyaku Co., Ltd.) were charged, and heated to a temperature of 80° C. Then, a mixed liquor of 300 g of methyl methacrylate, 180 g of butyl acrylate, 4 g of acrylic acid, 5 g of diacetone acrylamide, 330 g of ion exchanged water, 5 g of NOIGEN EA-170, and 1 g of potassium peroxide (as an initiator) was dropped over three hours with the temperature of the reaction liquor maintained at a temperature of 80° C. The reaction liquor was further reacted at a temperature of 80° C. for a period of three hours. After the reaction was terminated, it was cooled to room temperature, and adjusted to a pH of 8 with an aqueous 25% ammonium solution, whereby an aqueous acrylic emulsion having a solid content of 49.5%

STAIN RESISTANCE TEST

Into a container having a volume of 300 ml, 100 g of the above aqueous acrylic emulsion, and 3 g of a self-emulsifiable polyisocyanate with high functionality, and agitated by a homomixer at 2000 rpm for a period of 30 seconds, whereby a clear paint was prepared. This clear paint was applied to an aluminum plate by an applicator so that a dry film thickness of 20 μm can be provided, and thereafter it was cured at a temperature of 50° C. for a period of twenty hours so as to obtain coated samples. According to the procedure for a stain resistance test as prescribed in JIS S6037, about 4 cm² of the area of this sample was daubed with a black or red oil-based marking pen, and left for a period of 18 hours, and the stained portions were wiped out with an absorbent cotton which was infiltrated with petroleum benzine, and blisters and gloss on the surface of a coating film were evaluated.

EVALUATION CRITERIA

○ (with no change):
   Changes in tint and/or gloss, or blisters are not found;
Δ (with a slight change):
   Changes in tint and/or gloss are not large, and blisters are not found; and X (with a significant change):
   Changes in tint and gloss are large, or blisters are found even if changes in tint and/or gloss are not large.

TABLE 4

| | Application Examples | | | | | |
|---|---|---|---|---|---|---|
| | 1 | 2 | 3 | 4 | 5 | 6 |
| Self-Emulsifiable Polyisocyanate with High Functionality | P-1 | P-2 | P-3 | P-4 | P-5 | P-6 |
| Pot Life (Hours) | 5 | 5 | 5 | 7 | 8 | 7 |
| Rubbing Test (Times) | >100 | >100 | >100 | >100 | >100 | >100 |
| Stain Resistance Black | ○ | ○ | ○ | ○ | ○ | ○ |
| Red | ○ | ○ | ○ | ○ | ○ | ○ |

TABLE 5

| | Application Examples | | | | Application Comp. Ex. | |
|---|---|---|---|---|---|---|
| | 7 | 8 | 9 | 10 | 1 | 2 |
| Self-Emulsifiable Polyisocyanate with High Functionality | P-7 | P-8 | P-9 | P-10 | P-11 | P-12 |
| Pot Life (Hours) | 6 | 8 | 6 | 6 | 5 | 7 |
| Rubbing Test (Times) | >100 | >100 | >100 | >100 | 80 | 80 |
| Stain Resistance Black | ○ | ○ | ○ | ○ | Δ | Δ |
| Red | ○ | ○ | ○ | ○ | Δ-X | Δ-X |

From Tables 4 and 5, a self-emulsifiable polyisocyanate with high functionality from each of Application Examples was equivalent in pot life after water-dispersion to the one from each of Application Comparative Examples. However, since the self-emulsifiable polyisocyanate from each of Application Example has high functionality, it showed excellent crosslinking physical properties even in a smaller amount of load.

As compared with a conventional self-emulsifiable polyisocyanate, a self-emulsifiable polyisocyanate with high functionality of the present invention is equivalent or similar in water-dispersibility, lower in viscosity, more excellent in performance such as stain resistance, whereby it can be used as a base material or a curing agent for: a water-based paint, an aqueous adhesive, a sealing material, ink, an agent for treating fibers or glass fibers, a sizing agent, a stopping material, a primer, a consolidating agent, an anchor coating agent, various binders, or the like.

What is claimed is:

1. A self-emulsifiable polyisocyanate with high functionality, having the average number of functional groups in 4.3 or more and a viscosity of 8,000 mPa·s (at 25° C.) or less, which is obtained by subjecting a modified polyisocyanate containing allophanate bonds and a poly (oxyalkylene)glycol monoalkyl ether (e) having oxyethylene bonds in a total amount of 30 mole % or more in its molecule to a urethanization reaction, said modified polyisocyanate being obtained by reacting a polyol (a) having the average number of functional groups in an amount of 2 or more with an organic polyisocyanate (b) in the presence of an allophanate forming catalyst (c) comprising a zirconium carboxylate.

2. A self-emulsifiable polyisocyanate with high functionality according to claim 1, wherein said polyol (a) having the average number of functional groups in an amount of 2 or more is a-polyol including side chain alkyl groups.

3. A self-emulsifiable polyisocyanate with high functionality according to claim 1, wherein said organic polyisocyanate (b) is hexamethylene diisocyanate.

4. A self-emulsifiable polyisocyanate with high functionality according to claim 1, wherein the content of said poly(oxyalkylene)glycol monoalkyl ether (e) having oxyethylene bonds in a total amount of 30 mole % or more in its molecule to be used is in the range of 1 to 30% by weight of the resultant self-emulsifiable polyisocyanate with high functionality.

5. A process for producing a self-emulsifiable polyisocyanate with high functionality according to claim 1, wherein said process comprises the following first to fourth steps:

the first step: of reacting a polyol (a) having the average number of functional groups in an amount of 2 or more with an organic polyisocyanate (b) under an allophanate-forming catalyst (c) comprising a zirconium carboxylate;

the second step: of terminating the allophanate-forming reaction by adding a catalytic poison (d) thereto;

the third step: of removing a free organic polyisocyanate (b); and the fourth step: of subjecting a modified polyisocyanate containing allophanate bonds as provided in the third step and a poly(oxyalkylene)glycol monoalkyl ether (e) having oxyethylene bonds in a total amount of 30 mole % or more in its molecule to a urethanization reaction.

6. A process for producing a self-emulsifiable polyisocyanate with high functionality according to claim 5, wherein said polyol (a) having the average number of functional groups in an amount of 2 or more is a polyol including side chain alkyl groups.

7. A process for producing a self-emulsifiable polyisocyanate with high functionality according to claim 5, wherein said organic polyisocyanate (b) is hexamnethylene diisocyanate.

8. A process for producing a self-emulsifiable polyisocyanate with high functionally according to claim 5, wherein the amount of said poly(oxyalkylene)glycol monoalkylether (e) having oxyethylene bonds in a total amount of 30 mole % or more in its molecule to used is in the range of 1 to 30% by weight of the resultant self-emulsifiable polyisocyanate with high functionality.

* * * * *